April 2, 1935.   B. B. KAHN   1,996,473
STOVE
Filed July 29, 1932
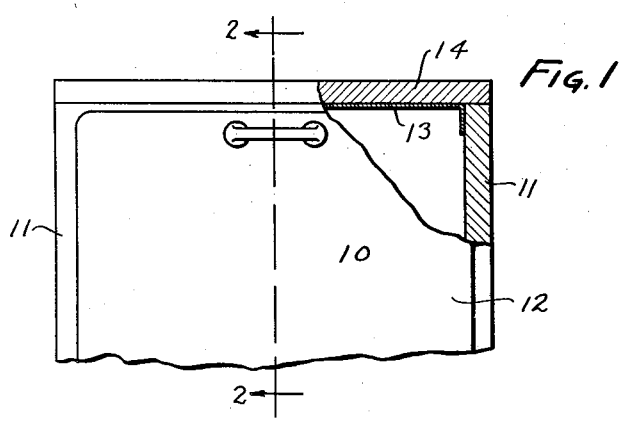
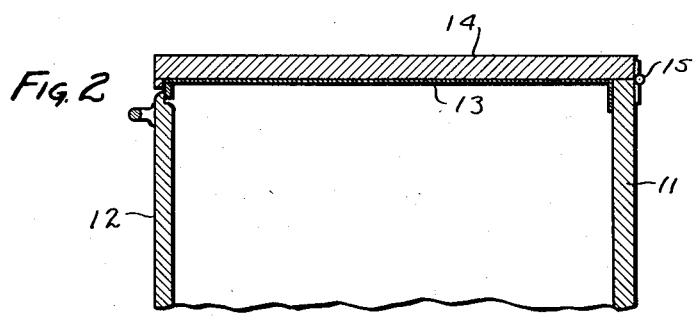
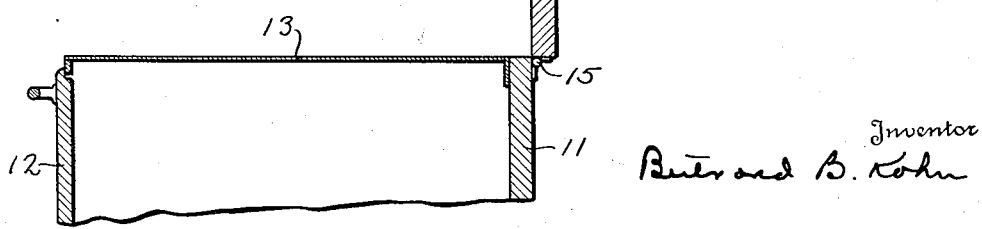
Inventor
Bertrand B. Kahn
By Marechal and Noe
Attorneys Patented Apr. 2, 1935

1,996,473

UNITED STATES PATENT OFFICE 1,996,473

STOVE

Bertrand B. Kahn, Cincinnati, Ohio, assignor to The Estate Stove Company, Hamilton, Ohio, a corporation of Ohio Application July 29, 1932, Serial No. 626,084

1 Claim. (Cl. 126—273)

This invention relates to stoves and more particularly to a construction in connection with ovens adaptable for accommodation to varying conditions of use.

For many, many years stoves for use in the kitchen were manufactured with no insulation for the oven space. As a result the cooking efficiency was decreased because of heat losses from the oven into the kitchen atmosphere. Not only that but these heat losses resulted in heating up of the atmosphere of the kitchen, which of course was quite undesirable during hot weather, although this heating of the air of the kitchen was quite desirable during the winter time, particularly in many installations where no other source of heating is provided for the kitchen other than the cooking stove itself. Subsequently, and this was particularly true as the urban population increased and the use of gas became more prevalent, it became the usual practice to heat insulate the ovens of stoves, thus increasing the efficiency of utility of the fuel so far as concerns cooking, and at the same time very greatly decreasing the heat losses into the atmosphere of the kitchen. While this heat insulation was desirable from the point of view of increased efficiency in utilization of the gas in cooking, and also from the point of view of cutting down the heat transfer into the air so as to make more livable working conditions during the hot months, nevertheless these desired results were attained at the expense of two other desirable results which were present in non-insulated ovens,—first, the heating of the kitchen space during the cooler weather, as referred to above; and, second the capacity to utilize the top of the oven for a warming space for dishes and pans and already cooked food. The heat insulation as utilized is ordinarily so effective that it greatly cuts down this capacity to serve as a warming space.

The present invention has for its object to provide a stove with a movable member effective when placed in position on top of the oven to give that desired degree of insulation which has heretofore been attained, and also adapted to be moved into non-insulating position so as to permit of attaining the other two desirable heating results which come from non-insulated ovens.

Other objects and advantages will be apparent from the description, the accompanying drawing, and the appended claim.

Referring to the drawing,—

Fig. 1 is a front elevational view of a stove constructed in accordance with the present invention;

Fig. 2 is a vertical sectional view on the line 2—2 of Fig. 1 showing the stove as arranged for heat insulating conditions; and Fig. 3 is a similar sectional view showing the stove arranged for heat radiating conditions.

Referring to the drawing which illustrates a preferred embodiment of the invention, the stove oven is indicated generally by numeral 10. This oven comprises side and end walls 11, and a front closure member 12 which are so constructed as to have good heat insulating properties;—being shown diagrammatically as provided with the usual insulation.

As shown, the top of the stove is provided with a sheet metal plate member 13, which is in heat conducting relation with the interior of the oven compartment. This sheet metal top member is preferably formed of stainless steel which is of high conductivity, and also of such character as to withstand the high temperatures to which it is subjected in use. If desired it may be enameled in black or some neutral color such that crazing, chipping, or scratching of the enamel as a result of being subjected to high temperature, or of having cooking utensils placed thereon, or materials therefrom spilled thereon, will not disfigure the appearance of the stove during those periods of use when that utility is desired which requires that this metal member be exposed.

The removable heat insulating section 14 is provided which is constructed to fit the top of the oven and to fit snugly over the sheet metal top and in this position to effectively complete the body of heat insulating material surrounding the oven. As shown the top is so constructed that it extends laterally to the outer edge of the side walls and the door of the oven so that the entire oven presents a flush appearance throughout. This top insulating member is connected by suitable hinges 15 to the body of the stove so that it can be readily swung to either the heat insulating position, as indicated in Fig. 2, where a minimum of heat transfer from the oven through the top plate 13 and into the kitchen atmosphere, or into dishes to be warmed, will take place, or to the heat transferring position as indicated in Fig. 3, where the sheet metal top 13 is exposed and a maximum of heat transfer for the desired purposes will take place.

In cold weather, during a cooking operation or when no cooking is taking place but it is desired merely to warm dishes or to heat up the kitchen, the cover 14 can be lifted from the top of the oven and the heated metal plate exposed to accomplish these results. Of course, the same results in this respect may be obtained either when the cooking operation is not going on or when it is, in which event the results are obtained without in any way affecting the cooking operation in progress within the oven. A maximum of over-all efficiency is obtained at all times as heat losses are made very low and the efficiency of heat utilization in the cooking operation kept high when the cover 14 is in place, and when it is removed, heat transfer is restricted to a predetermined section where it is used to the greatest advantage.

While the form of apparatus herein described constitutes a preferred embodiment of the invention, it is to be understood that the invention is not limited to this precise form of apparatus, and that changes may be made therein without departing from the scope of the invention which is defined in the appended claim.

What is claimed is:

In a cooking stove comprising as a part thereof an oven, said oven comprising a plurality of side walls, a top and a closure member, enclosing therein an oven compartment, heat insulation for said walls and closure member, the top member being of heat conducting material adapted to transmit heat from the interior of the oven to the atmosphere and a heat insulating member movably connected to the stove structure so that it can be swung down to overlie said top member.

BERTRAND B. KAHN.